United States Patent [19]

Strengowski

[11] 4,281,541

[45] Aug. 4, 1981

[54] GAS METER WITH COMPOSITE IRON CENTER CASTING

[75] Inventor: Stanley S. Strengowski, Monroe, Conn.

[73] Assignee: Textron, Inc., Providence, R.I.

[21] Appl. No.: 76,996

[22] Filed: Sep. 19, 1979

[51] Int. Cl.³ .................................................. G01F 3/20
[52] U.S. Cl. ...................................................... 73/264
[58] Field of Search .................................. 73/263–266, 73/274, 278

[56] References Cited

U.S. PATENT DOCUMENTS

| | | | |
|---|---|---|---|
| 1,283,025 | 10/1918 | Armstrong | 73/263 |
| 2,680,375 | 6/1954 | Schavs | 73/266 |

Primary Examiner—Herbert Goldstein
Attorney, Agent, or Firm—Cifelli & Frederick

[57] ABSTRACT

A positive displacement gas meter includes a two-piece composite center casting. The first piece is a center chamber casting which has a lower cylindrical wall partially defining the center chamber and an upper manifold portion defining passages to front and rear chambers defined by diaphragms and front and rear covers secured to the center chamber casting. The second piece comprises a valve chamber manifold casting which mounts to the top of the center chamber casting and defines openings registering with the openings to the front and rear chambers. The valve chamber manifold also partially defines a center chamber and defines an opening thereto, and further at least partially defines an exhaust passage having a collection end adjacent the openings to the chambers and leading to an outlet end. A valve seat having a sliding valve cover is mounted to the valve chamber manifold casting, and a top casting fits thereover and is secured to the valve chamber manifold casting. The valve chamber manifold casting further defines an integral depending support bracket for mounting a center shaft gas meter, the center shaft being rotated by a linkage to the diaphragms and in turn revolving the valve cover on the valve seat. A meter readout assembly is also provided.

10 Claims, 8 Drawing Figures

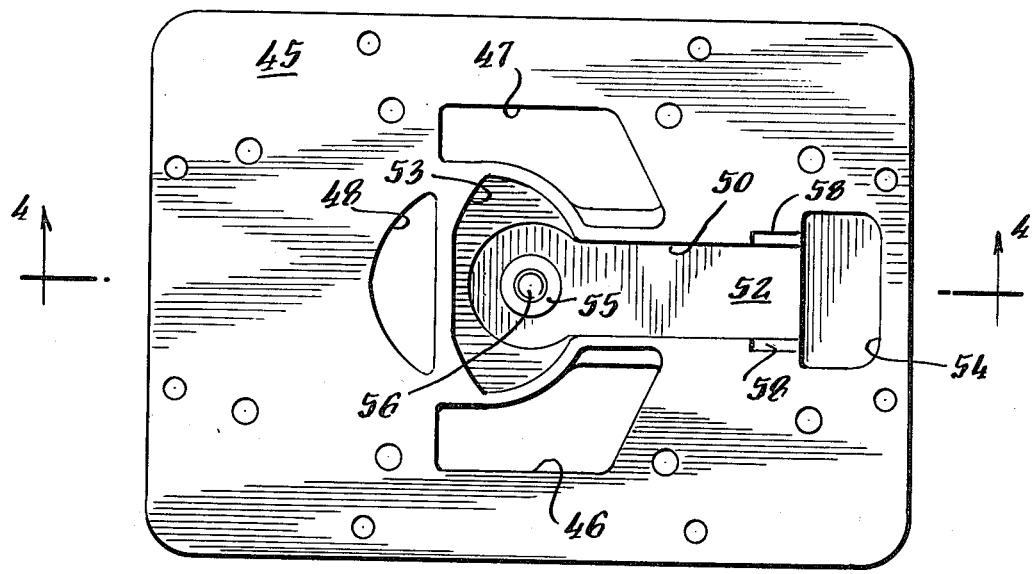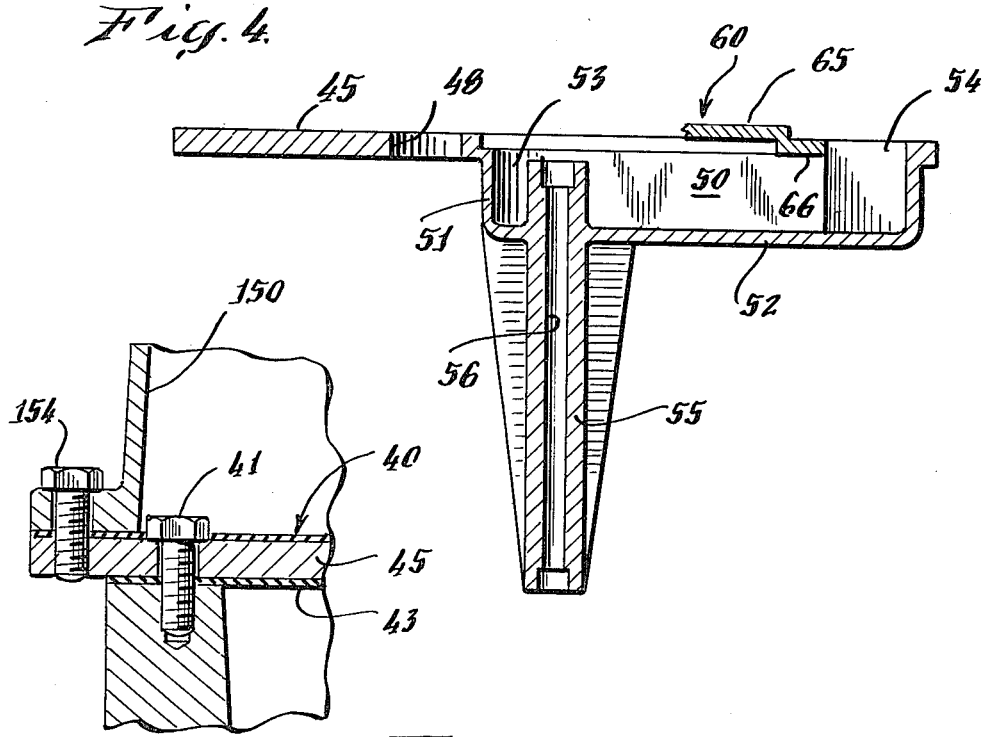

GAS METER WITH COMPOSITE IRON CENTER CASTING

BACKGROUND OF THE INVENTION

This invention relates to an improved positive displacement gas meter including a simplified composite center casting including center chamber casting and a valve chamber manifold casting providing mounting support for the diaphragm linkage and crank assembly.

Positive displacement gas meters are well-known in the art and are manufactured by, among others, Sprague Meter Division of Textron, Inc., assignee of this application. FIGS. 7 and 8 of the drawings herein illustrate a prior art positive displacement gas meter 100. The gas meter 100 generally comprises a center casting 110 which is generally cylindrical and defines a center chamber 111. A front cover 130 is mounted to the front side of the center casting 110, and the peripheral edge 133 of a front diaphragm 135 is clamped between the front cover and the center casting. Thus, a front chamber 136 is defined between the front cover and the front diaphragm. Similarly, a rear cover 140 is mounted to the opposite rear side of the center casting 110, clamping the peripheral edge 143 of a rear diaphragm 145 therebetween and defining a rear chamber 146.

The upper portion of the center casting 110, generally designated at 112 and also seen in top plan view in FIG. 8, is a relatively complex configuration defining passages, etc. More particularly, the upper portion 112 of the center casting 110 defines an L-shaped passage 113 which is aligned with a passage 131 formed in the front cover 130 to provide gas communication with the front chamber 136. A similar L-shaped passage 114 defined by the upper portion of the center casting is aligned with passage 141 in the rear cover 140 to provide gas communication with the rear chamber 146. A passage 115 (see FIG. 8) is provided to the center chamber 111, and a manifold passage 116 leads to an outlet 117. The bottom wall 118 of the manifold passage 116 is provided with a threaded sleeve 119. A support bracket 120 is threadably received in the sleeve 119, and the bracket 120 carries a main shaft 121 having a diaphragm linkage assembly 122 mounted to the lower end thereof. The diaphragm linkage assembly 122 includes levers, wire brackets pivotally mounted to the levers and to the diaphragms, all connecting the front and rear diaphragms such that the center shaft 121 is rotated as the gas meter operates.

The top surface of the center casting 110, designated by the number 123 in FIG. 8, is planar and mounts a valve seat 125. The valve seat 125 has openings which connect with the passages 113–116 of the center casting 110. The valve seat 125 also mounts a bearing passing the main shaft 121. A valve cover 127, having a recessed annular cavity 128, is slidably mounted on the valve seat 125 and is driven in a circular motion thereon by a crank and offset crank pin 129 connected to the main shaft 121.

A top casting 150 is also mounted to the center casting 110, and the top casting 150 mounts a meter readout assembly very generally indicated at 151, the meter drive being taken from the circular motion of the valve cover 127. The top casting 150 also mounts an inlet 152 wherein gas is input to the meter, and defines an outlet passage (not shown) which connects with outlet 117 of the manifold passage 116 of the center casting 110.

In operation, the incoming gas is sequentially directed to one of the front, center and rear chambers as the valve cover moves in its circular path opening the various passages to the chambers, and gas is also expelled from the meter as the annular cavity of the valve cover connects the passages to the chambers with the manifold passage 116 leading to outlet 117. In particular, as a chamber fills with gas, it expands its diaphragm, thereby emptying an adjacent chamber, and the movement of the diaphragm rotates the shaft 121 to revolve the valve seat and maintain continual operation. The meter readout 151 is driven by the rotating valve cover.

The center casting in the above described gas meter is generally cast from iron or aluminum. An iron casting is more rugged, however, the intricacies of the casting make it both difficult and expensive to manufacture. Additionally, accuracy of the center casting is also difficult to achieve because of its complexity, and in particular, it is somewhat difficult to achieve precise alignment of the various passages to achieve good alignment of the operating mechanism (the main shaft and diaphragm linkage and crank assemblies) and to achieve dependable sealing.

SUMMARY OF THE INVENTION

It is a principal object of the invention herein to provide an improved positive displacement gas meter.

It is another object of the invention herein to provide an improved positive displacement gas meter which is constructed of simple, rugged castings.

It is a further object of the invention herein to provide a positive displacement gas meter with a composite center casting which is accurate and, in particular, provides for accurate mounting support of the diaphragm linkage and crank assembly.

It is an additional object of the invention herein to provide an improved positive displacement gas meter incorporating a two-piece composite center casting compatible with parts of existing positive displacement gas meters.

An improved positive displacement gas meter according to the invention herein incorporates a two-piece composite center casting. One of the pieces is a center chamber casting, preferably fabricated of cast iron for strength and durability. It is generally cylindrical and provides for mounting a front cover and front diaphragm to form a front chamber and for mounting a rear cover and rear diaphragm to form a rear chamber, a central chamber being defined by the center chamber casting between the front and rear diaphragms. The center chamber casting defines passages which join with passages in the front and rear covers to provide for entry and exhaust of gas from the front and rear chambers, these passages terminating on a flat top surface of the center chamber casting. The second piece of the composite center casting comprises a valve chamber manifold casting which is mounted to the top surface of the center chamber casting. The valve chamber manifold casting defines a passage for the entry and exhaust of gas from the center chamber and defines openings registering with the passages in the center chamber casting leading to the front and rear chambers. The manifold center casting further defines a manifold passage including a collection end adjacent the openings to the chambers, the passage leading to an outlet end. An integral depending mounting support bracket is provided to mount the shaft carrying the diaphragm linkage and crank assembly. The valve chamber manifold casting may be fabricated of either iron or aluminum, and the casting can be accomplished by powdered metal diecasting techniques, if desired.

The two-piece composite center casting replaces the intricate one-piece center casting in extant positive displacement gas meters, accepting other parts from the extant meters, including the diaphragm linkage and crank assembly, the valve seat and sliding valve cover, the top casting and the meter readout assembly. When those parts are mounted to the two-piece composite center casting according to the invention herein, good sealing is achieved as well as good alignment and positioning of the diaphragm linkage and carrier assembly, thereby providing an accurate, rugged and less expensive positive displacement gas meter.

Other and more specific objects and features of the invention herein will in part be obvious and will in part appear from a perusal of the following description of the preferred embodiment and the claims, taken together with the drawings.

DRAWINGS

FIG. 3 is a top plan view of the valve chamber manifold casting of the gas meter of FIG. 1;

FIG. 4 is a sectional view of the valve chamber manifold casting of FIG. 3 taken along the lines 4—4 of FIG. 3;

FIG. 5 is a segmental view showing the attachment and sealing of the valve chamber manifold casting to the center chamber casting and of the top casting to the valve chamber manifold casting;

The same reference numerals refer to the same elements throughout the various Figures.

DESCRIPTION OF PREFERRED EMBODIMENT

Figure 1:
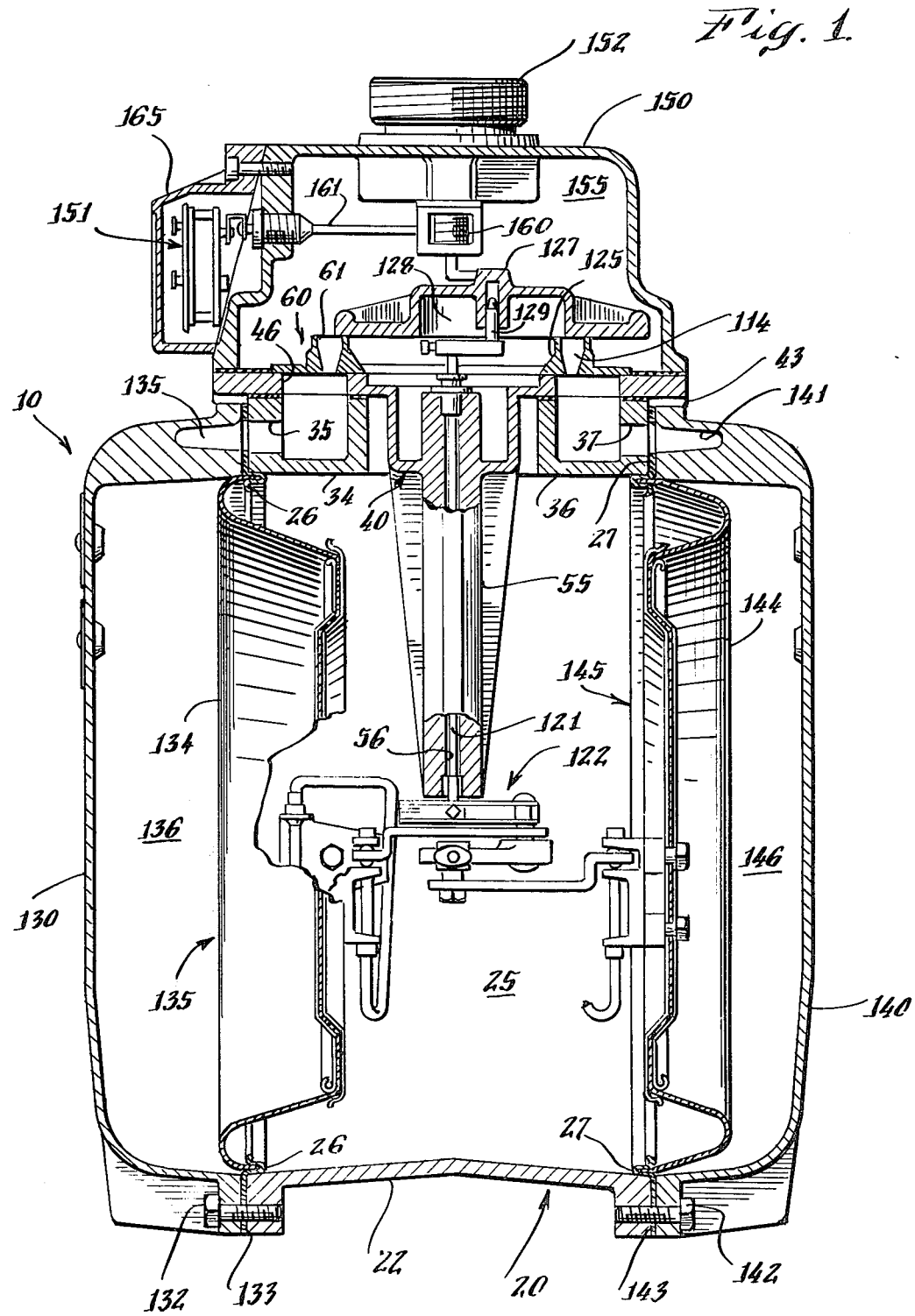
FIG. 1 is a sectional view of a positive displacement gas meter incorporating the two-piece composite center casting according to the invention herein.
Figure 7:
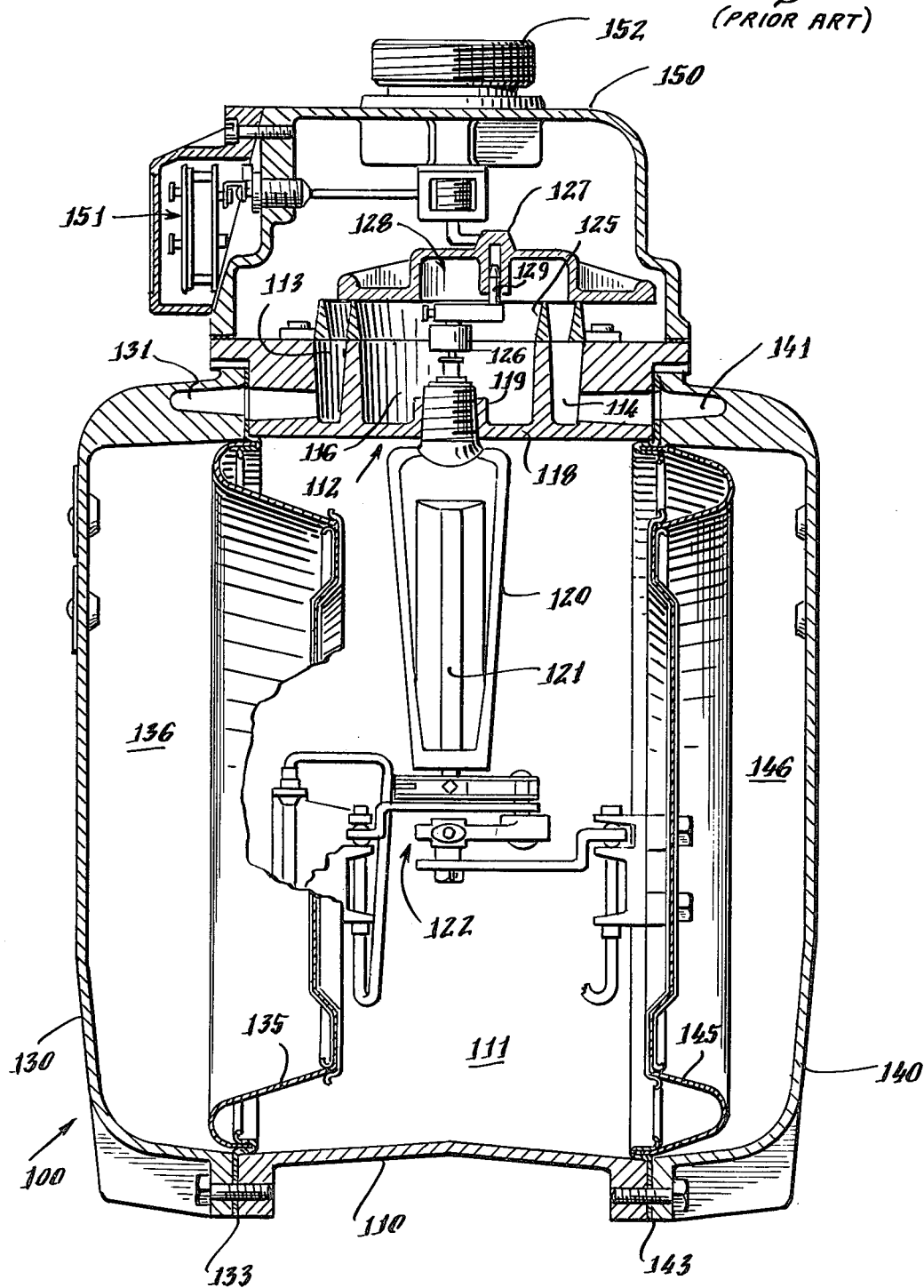
FIG. 7 is a sectional view of a prior art positive displacement gas meter.
Figure 8:
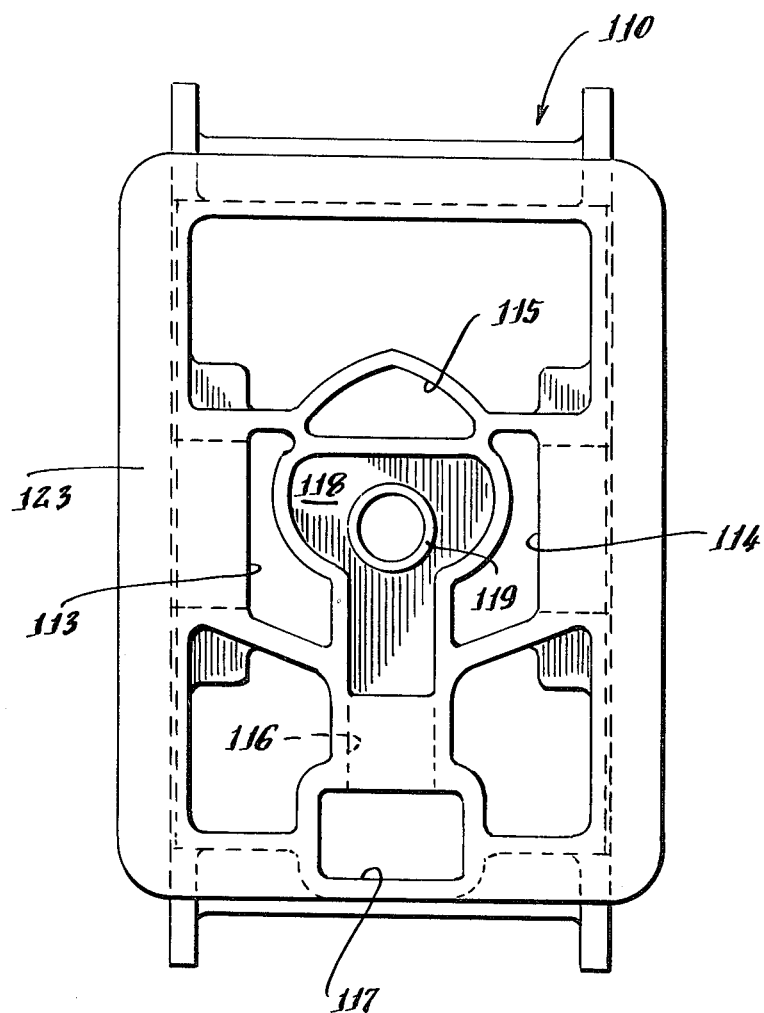
FIG. 8 is a top plan view of the center casting of the gas meter of FIG. 7.

With reference to FIG. 1, there is shown in section a positive displacement gas meter 10 incorporating a two-piece composite center casting including a center chamber casting 20 and a valve chamber manifold casting 40 according to the invention herein. The other parts of the gas meter 10 are the same or similar to those of the prior art positive displacement gas meter 100 shown in FIGS. 7 and 8 and described above.

Figure 2:
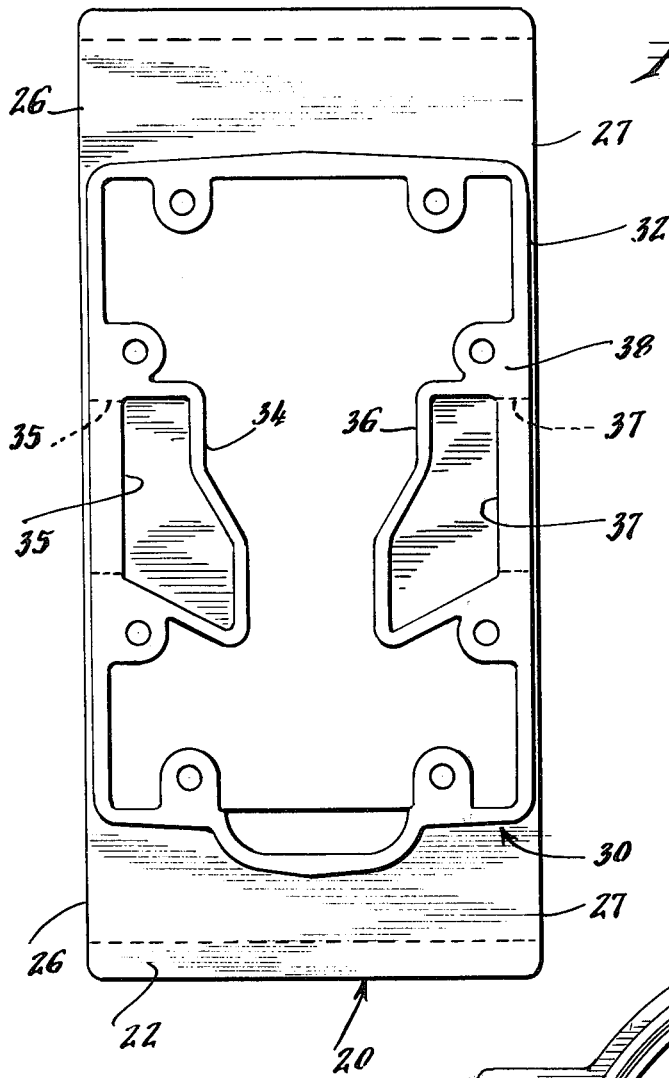
FIG. 2 is a top plan view of the center chamber casting of the gas meter of FIG. 1.

The center chamber casting 20, also seen in FIG. 2, has a generally cylindrical lower wall 22 which partly defines a center chamber 25 of the gas meter 10. The cylindrical lower wall defines outwardly facing flat annular surfaces 26 and 27 on its opposite sides.

The center chamber casting 20 further comprises an upper manifold portion 30, which is integral with and upstanding from the cylindrical lower wall 22. The manifold portion 30 comprises a generally rectangular outside wall 32 and further comprises walls 34 and 36 which, respectively, define L-shaped passages 35 and 37. The L-shaped passage 35 opens at the annular flat surface 26, and the L-shaped passage 37 opens at the annular flat surface 27. The upper surfaces of the walls 32, 34, 36 lie in the same plane, wherein the center chamber casting 20 has a flat continuous top surface 38, with the passages 35 and 37 opening at the flat top surface 38. Additionally, the walls 32, 34 and 36 are provided with enlarged portions which have threaded openings for attaching other parts of the gas meter 10, as seen in FIGS. 2 and 5 and further discussed below. The center chamber casting is preferably cast iron, and the casting of it is made easier by its relative simplicity.

The peripheral edge 133 of a front diaphragm 135 is clamped between the flat annular front surface 126 of the center chamber casting 20 and a front cover 130, which is secured to the center chamber casting 20 by bolts 132. The front cover 130 and front diaphragm 135 together define a front chamber 136 of the gas meter 10, the chamber being of variable volume due to a flexible portion 134 of the front diaphragm 135. The front cover 130 includes a passage 135 which meets with the passage 35 in the center chamber casting 20, thereby providing gas communication between the passage 35 and the front chamber 136. The peripheral edge 133 of the diaphragm 135 is provided with an opening which aligns the openings 35 and 135 for this purpose.

Similarly, the peripheral portion 143 of rear diaphragm 145 is clamped between the annular flat rear surface 27 and a rear cover 140, thereby defining a rear chamber 146 of the gas meter 10. The rear cover 140 is secured to the center chamber casting 20 by bolts 142. The rear cover 140 defines a cover passage 141 which joins the rear chamber 146 with the L-shaped passage 37 in the center chamber casting 20. The peripheral edge of the rear diaphragm 145 has an opening at the area where passages 141 and 37 meet. The rear diaphragm also has a flexible portion 144, whereby volume of the rear chamber 146 is variable.

The valve chamber manifold casting 40, shown in FIGS. 3 and 4, is mounted to the top surface 38 of the center chamber casting 20, and defines openings and passages directing the flow of gas through the gas meter 10 and also mounting other elements of the gas meter 10. More particularly, the valve chamber manifold casting 40 comprises a flat plate 45, the peripheral edges of which rest on the top surface 38 of the center chamber casting 20. Bolts 41 secure the valve chamber manifold casting to the center chamber casting, and a sealing gasket 43 is provided, as best seen in FIG. 5. The valve chamber manifold casting 40 defines a first opening 46 which registers with the opening of passage 35 at the top of the center chamber casting 20 and defines a second opening 47 which aligns with the opening of passage 37, also at the top of the center chamber casting. Thus, the valve chamber manifold casting permits gas communication with both the front and rear chambers 136 and 146. An opening 48 in the valve chamber manifold casting 40 provides a passage to the center chamber 25, and except for the opening 48 the center chamber 25 is closed by the valve chamber manifold casting 40. The valve chamber manifold casting 40 further comprises an outlet passage 50 defined by sidewall 51 depending from plate 45 and by bottom wall 52 integral with the sidewall 51. The outlet passage 50, as best seen in FIG. 3, is enlarged at a first collection end 53 to lie closely adjacent the openings 46–48 leading to the chambers of the gas meter. As will be more fully discussed below, gas exits the gas meter by passing from the openings 46–48 to the enlarged collection end 53, and along the outlet passage 50 to its output end 54. Notches 58 are formed adjacent the outlet end 54. Integral with the bottom wall 52 of the outlet passage 50 is a depending mounting support bracket 55 defining an elongated central opening 56, the mounting support bracket extending into the center chamber 25 of the gas meter 10.

It will be appreciated that the valve chamber manifold casting 40, not forming an outer portion of the gas meter 10, need not be as rugged as the center chamber casting 20, and accordingly, may be fabricated of aluminum or other metals in a powder metal die casting technique. It will further be appreciated that both the center chamber casting 20 and the valve chamber manifold casting 40 are relatively simple castings when compared with the prior art center casting 110, and that as one byproduct of the simplicity, the castings can be made more accurate.

Figure 6:
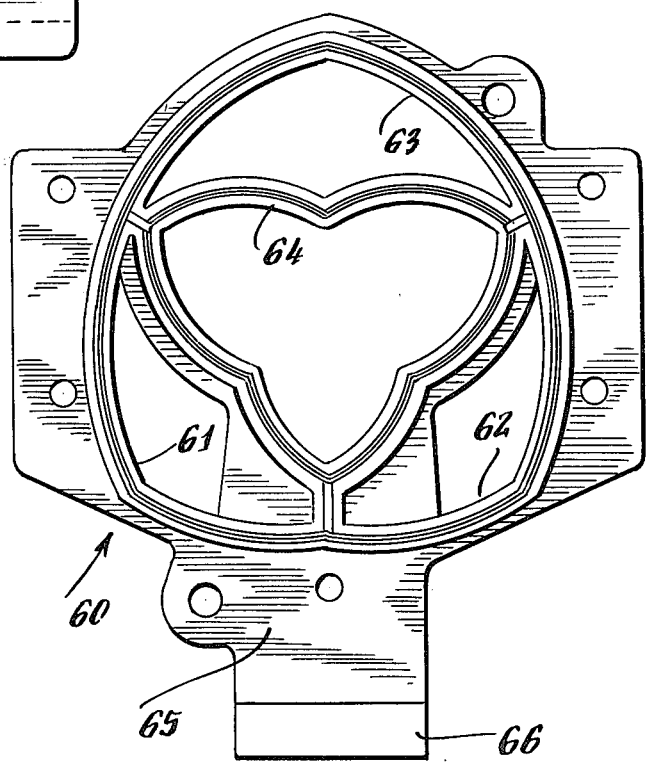
FIG. 6 is a top view of a valve seat of the gas meter of FIG. 1, the valve seat being shown enlarged.

The positive displacement gas meter 10 further comprises a valve seat 60, shown in plan in FIG. 6, which is secured to the top of plate 45 of the valve chamber manifold casting 40. The valve seat 60 defines an opening 61 which is positioned over the opening 46 in the valve chamber manifold casting 40 and thereby is connected with the front chamber 136. Similarly, an opening 62 registers with the rear chamber 146. An additional opening 63 joins with opening 48 of the valve chamber manifold casting 40, opening 63 thereby being in communication with the center chamber 25. The valve seat 60 has a central opening 64 at the enlarged collection end 53 of outlet passage 50, providing an entrance to that passage. A "tail" 65 of the valve seat 60 forms the top of the outlet passage as it extends toward its outlet end, and the "tail" has an offset flange 66 which fits into the notches 58, whereby the top of flange 66 and the top surface of plate 45 of the valve chamber manifold casting 40 are flush. This is seen in FIG. 4, where a segment of the tail 65 is shown positioned on the valve chamber manifold casting.

Valve cover 127 rests on the top of the valve seat 60 and is driven in a revolving circular motion as the gas meter operates. The valve cover has an annular cavity 128. A central shaft 121 is rotatably received in the opening 56 formed in the depending mounting support bracket 55 of the valve chamber manifold casting 40. A lower diaphragm linkage assembly, generally indicated at 122, is secured to the lower end of the shaft 121. A tangent crank assembly including an offset crank pin 129 is attached to the top of the shaft 121, the crank pin being received in a central opening of the valve cover 127. The lower diaphragm linkage assembly is connected with the front and rear diaphragms 135 and 145, as best seen in FIG. 1 and as in prior art gas meters. The shaft 121 and, therefore, the diaphragm linkage and crank assemblies are accurately positioned and aligned by the mounting support bracket 55.

A top casting 150 is secured to the valve chamber manifold casting 40 by machine screws 154, as seen in FIGS. 1 and 5. An inlet pipe 152 opens into the top chamber 155 defined by the top casting 150, and the top casting 150 also defines an outlet (not shown) which extends from the outlet end 54 of the outlet passage 50 to the exterior of the gas meter. The top casting 150 mounts the meter readout assembly 151, including an index drive screw 160 which is rotated by the valve cover 127 and in turn rotates a shaft 161. The shaft 161 drives pointers on dials to indicate gas used. A cover 165 is secured to the top casting 150 over the meter readout assembly 151.

The gas meter 10 operates in the same manner as prior art positive displacement gas meters. In general, when gas is flowing through the gas meter 10 it enters the inlet 152, passes through the top chamber 155 and through an exposed one of openings 61-63 in the valve seat 60. Gas exits the gas meter 10 by flowing out one of the openings 61-63 which is covered by the valve cover 127, and in particular, flows through the annular cavity 128 in the valve cover, through opening 64 of the valve seat, and along the outlet passage 50. As an example, consider that opening 63 is exposed. Gas flows through the top chamber 155, through exposed opening 63 in valve seat 60, continues through opening 48 in valve chamber manifold 40 and into center chamber 25, causing diaphragms 135 and 145 to move outward. This outward movement causes residual gas in front chamber 136 to be forced out through passages 135, 35, openings 46, 61, cavity 128 and opening 64 where it enters the outlet passage 50 of the gas meter.

Because of the outward movement of the diaphragms, the diaphragm linkage assembly 122 operates to rotate shaft 121 and upper crank and offset crank pin 129 causing valve cover 127 to slide around on valve seat 60 tending to expose opening 61 to the flow of gas entering top chamber 155. Because opening 61 is now exposed, the gas flow is diverted to the front chamber 136 causing diaphragm 135 to move toward the rear and forcing residual gas out of center chamber 25 through openings 48, 63, through cover cavity 128, and into the outlet passage 50 of the gas meter. As diaphragm 136 moves rearward, the shaft 121 continues to rotate until opening 62 is exposed, filling rear chamber 146, moving diaphragm 145 forward, and rotating the shaft 121 until valve cover 127 has made one complete traverse of the valve seat 60. The revolutions of the valve cover are recorded on the meter readout assembly.

Accordingly, a rugged positive displacement gas meter having simplified parts and construction is provided, the gas meter admirably achieving the objects of the invention herein. It will be understood that various changes and modifications may be made in the above-described preferred embodiment without departing from the spirit and scope of the invention which is limited only by the following claims.

I claim:

1. An improvement in positive displacement gas meters of the type comprising a center casting, front and rear diaphragms and front and rear covers together defining a front, a center and a rear chamber of variable volumes with the center casting defining passages to the chambers and an outlet passage, a top casting mounted over the center casting and accepting inlet gas, a valve seat mounted to the center casting within the top casting and further defining the passages to the chambers and outlet, a valve cover slidingly positioned on the valve seat for sequentially opening the passages to inlet gas and selectively connecting the passages to the outlet, a central shaft rotated by a linkage assembly connected to the diaphragms and revolving the valve cover, and a meter readout assembly, the improvement comprising providing the center casting as a two-piece composite center casting including:

(A) a center chamber casting having a cylindrical wall portion partially defining the center chamber of the gas meter, the cylindrical wall portion having outwardly facing annular surfaces receiving the peripheral edges of the front and rear diaphragms and the front and rear covers, and an upper manifold portion having a top surface and defining a passage from the top surface to the front chamber and also defining a passage from the top surface to the rear chamber; and (B) a manifold casting including a plate mounted to the top surface of the center chamber casting and having the top casting mounted thereto, the plate defining an opening registering with the passages to the front and rear chambers and further defining an opening providing a passage to the center chamber, the manifold casting also at least partially defining an outlet passage to an outlet end from a collection end thereof positioned adjacent the openings to the chambers, the valve seat being mounted to the top of the plate of the manifold casting, the manifold casting further including a depending integral support bracket for the center shaft.

2. An improvement in positive displacement gas meters as defined in claim 1 wherein the valve seat mounted to the plate of the manifold casting includes a tail portion forming the top of the outlet passage.

3. An improvement in positive displacement gas meters as defined in claim 2 wherein the tail portion of the valve seat has an offset flange at the end thereof, the offset flange portion being received in matingly configured notches defined by the manifold casting adjacent the outlet end of the outlet passage, wherein the offset flange and the plate of the manifold casting lie in the same plane surrounding the outlet end of the outlet passage.

4. A gas meter comprising:
(A) a center chamber casting having a lower cylindrical wall portion with outwardly facing front and rear annular flanges and an upper manifold portion, the upper manifold portion having a flat top surface and including walls defining a first L-shaped passage leading from the top surface to the front outwardly facing annular flange and a second L-shaped passage leading from the top surface to the rear outwardly facing annular flange;
(B) front and rear diaphragms, the peripheral edges of which are respectively received on the front and rear outwardly facing annular flanges of the center chamber casting, thereby defining a center chamber;
(C) front and rear covers respectively secured to the front and rear outwardly facing annular flanges of the center chamber and clamping the peripheral edges of the diaphragms therebetween, the covers and the diaphragms thereby forming front and rear chambers, the front and rear covers each defining a passage registered with the passage in the center chamber casting to provide gas communication with the front and rear chambers;
(D) a valve chamber manifold casting including a plate mounted to the flat top surface of the center chamber casting and defining openings registered with the openings to the front and rear chambers, the valve chamber manifold casting together with the center chamber casting and front and rear diaphragms defining a center chamber, the valve chamber manifold casting defining an opening to the center chamber and also at least partially defining an exhaust passage including a collection end adjacent the openings to the chambers and an outlet end, the valve chamber manifold casting further including a depending integral support bracket extending into the center chamber;

(E) a valve seat mounted to the top plate of the valve chamber manifold casting and defining openings registering with the openings to the chambers and also defining an opening to the collection end of the exhaust passage, the valve seat also defining the top of the exhaust passage intermittent the collection end and the outlet end;
(F) a valve cover slidingly positioned on the valve seat, the valve cover including an annular recessed cavity for sequentially connecting the passages from the chambers with the collection end of the exhaust passage as the valve cover revolves on the valve seat and also sequentially opening the passages to the chambers for admitting inlet gas;
(G) a center shaft mounted to the depending integral support bracket, connected by a diaphragm linkage to the diaphragms and rotated by the action of the diaphragms as the gas meter operates, the center shaft having an offset crank pin received in the valve cover for revolving the valve cover;
(H) a top casting mounted to the top plate of the valve chamber manifold casting and defining an inlet passage for inlet gas and further defining an outlet passage registered with the outlet end of the exhaust passage; and
(I) a meter readout assembly driven to count the rotations of the center shaft and providing a readout thereof indicative of gas which has passed through the gas meter.

5. An improvement in positive displacement gas meters as defined in claim 4 wherein the valve seat mounted to the plate of the manifold casting includes a tail portion forming the top of the exhaust passage.

6. An improvement in positive displacement gas meters as defined in claim 5 wherein the tail portion of the valve seat has an offset flange at the end thereof, the offset flange portion being received in matingly configured notches defined by the manifold casting adjacent the outlet end of the exhaust passage, wherein the offset flange and the plate of the manifold casting lie in the same plane surrounding the outlet end of the exhaust passage.

7. An improvement in positive displacement gas meters of the type comprising a center casting, front and rear diaphragms and front and rear covers together defining a front, a center and a rear chamber of variable volumes with the center casting defining passages to the chambers and an outlet passage, a top casting mounted over the center casting and accepting inlet gas, a valve seat mounted to the center casting within the top casting and further defining the passages to the chambers and outlet, a valve cover slidingly positioned on the valve seat for sequentially opening the passages to inlet gas and selectively connecting the passages to the outlet, a central shaft rotated by a linkage assembly connected to the diaphragms and revolving the valve cover, and a meter readout assembly, the improvement comprising providing the center casting as a two-piece composite center casting including:
(A) a center chamber casting having a cylindrical wall portion partially defining the center chamber of the gas meter, the cylindrical wall portion having outwardly facing annular surfaces receiving the peripheral edges of the front and rear diaphragms and the front and rear covers, and an upper manifold portion having a top surface and defining a passage from the top surface to the front chamber and also defining a passage from the top surface to the rear chamber; and (B) a manifold casting including a plate mounted to the top surface of the center chamber casting and having the top casting mounted thereto, the plate defining an opening registering with the passages to the front and rear chambers and further defining an opening providing a passage to the center chamber, the manifold casting also at least partially defining an outlet passage to an outlet end from a collection end thereof positioned adjacent the openings to the chambers, the valve seat being mounted to the top of the plate of the manifold casting, the valve seat including a tail portion forming the top of the outlet passage.

8. An improvement in positive displacement gas meters as defined in claim 7 wherein the tail portion of the valve seat has an offset flange at the end thereof, the offset flange portion being received in matingly configured notches defined by the manifold casting adjacent the outlet end of the outlet passage, wherein the offset flange and the plate of the manifold casting lie in the same plane surrounding the outlet end of the outlet passage.

9. A gas meter comprising:

(A) a center chamber casting having a lower cylindrical wall portion with outwardly facing front and rear annular flanges and an upper manifold portion, the upper manifold portion having a flat top surface and including walls defining a first L-shaped passage leading from the top surface to the front outwardly facing annular flange and a second L-shaped passage leading from the top surface to the rear outwardly facing annular flange;

(B) front and rear diaphragms, the peripheral edges of which are respectively received on the front and rear outwardly facing annular flanges of the center chamber casting, thereby defining a center chamber;

(C) front and rear covers respectively secured to the front and rear outwardly facing annular flanges of the center chamber and clamping the peripheral edges of the diaphragms therebetween, the covers and the diaphragms thereby forming front and rear chambers, the front and rear covers each defining a passage registered with the passage in the center chamber casting to provide gas communication with the front and rear chambers;

(D) a valve chamber manifold casting including a plate mounted to the flat top surface of the center chamber casting and defining openings registered with the openings to the front and rear chambers, the valve chamber manifold casting together with the center chamber casting and front and rear diaphragms defining a center chamber, the valve chamber manifold casting defining an opening to the center chamber and also at least partially defining an exhaust passage including a collection end adjacent the openings to the chambers and an outlet end;

(E) a valve seat mounted to the top plate of the valve chamber manifold and defining openings registering with the openings to the chambers and also defining an opening to the collection end of the exhaust passage, the valve seat including a tail portion defining the top of the exhaust passage intermittent the collection end and the outlet end;

(F) a valve cover slidingly positioned on the valve seat, the valve cover including an annular recessed cavity for sequentially connecting the passages from the chambers with the collection end of the exhaust passages as the valve cover revolves on the valve seat and also sequentially opening the passages to the chambers for admitting inlet gas;

(G) a center shaft connected by a diaphragm linkage to the diaphragms and rotated by the action of the diaphragms as the gas meter operates, the center shaft having an offset crank pin received in the valve cover for revolving the valve cover;

(H) a top casting mounted to the top plate of the valve chamber manifold casting and defining an inlet passage for inlet gas and further defining an outlet passage registered with the outlet end of the exhaust passage; and (I) a meter readout assembly driven to count the rotations of the center shaft and providing a readout thereof indicative of gas which has passed through the gas meter.

10. An improvement in positive displacement gas meters as defined in claim 9 wherein the tail portion of the valve seat has an offset flange at the end thereof, the offset flange portion being received in matingly configured notches defined by the manifold casting adjacent the outlet end of the exhaust passage, wherein the offset flange and the plate of the manifold casting lie in the same plane surrounding the outlet end of the exhaust passage.

* * * * *